United States Patent [19]

Somerville

[11] Patent Number: 4,707,776

[45] Date of Patent: Nov. 17, 1987

[54] METAL OXIDE SEMICONDUCTOR STABILIZED DC TO DC/AC CONVERTER

[75] Inventor: Thomas A. Somerville, Tucson, Ariz.

[73] Assignee: Burr-Brown Corporation, Tucson, Ariz.

[21] Appl. No.: 929,758

[22] Filed: Nov. 12, 1986

Related U.S. Application Data

[63] Continuation of Ser. No. 646,225, Aug. 30, 1984, abandoned.

[51] Int. Cl.$^4$ ............................................. H02M 7/538
[52] U.S. Cl. ........................................ 363/134; 363/24
[58] Field of Search ................... 363/22, 24, 97, 131, 363/133, 136

[56] References Cited

U.S. PATENT DOCUMENTS

| 3,569,816 | 3/1971 | Marzolf | 363/24 |
| 4,061,957 | 12/1977 | Vader | 363/22 |
| 4,095,128 | 6/1978 | Tanigaki | 363/134 |
| 4,390,937 | 6/1983 | Clark | 363/133 |

FOREIGN PATENT DOCUMENTS

| 570734 | 12/1975 | Switzerland | 363/131 |
| 849390 | 7/1981 | U.S.S.R. | 363/134 |
| 1034136 | 8/1983 | U.S.S.R. | 363/24 |

Primary Examiner—William H. Beha, Jr.
Attorney, Agent, or Firm—Harry M. Weiss & Associates

[57] ABSTRACT

In the primary circuit of dc-to-dc converter or a dc-to-ac converter, transistor switching units are associated with two primary windings of a transformer. The transistor switching units each control the flow of current through an associated winding. The first transistor is activated by apparatus that alternatively applies and removes activation signals to the transistor and consequently allows conduction through the transistor and the associated winding. The second transistor receives activation signals from a third primary winding and causes conduction of current through the associated primary transformer winding. The activation signal from the third winding, causing the second transistor to be conductive, is the result of interruption of current in the first primary transformer winding. The activation signals produced by the third primary transformer winding is removed when the first transistor is activated and current is flows in the first primary winding.

8 Claims, 2 Drawing Figures

METAL OXIDE SEMICONDUCTOR STABILIZED DC TO DC/AC CONVERTER

This application is a continuation of application Ser. No. 646,225, filed 8/30/84 now abandoned.

BACKGROUND OF THE INVENTION

1. Field of the Invention

This invention relates generally to dc-to-dc and dc-to-ac converters and more particularly to converters that utilize current switches to activate primary coils of the transformer involved in the conversion.

2. Description of the Related Art

It is known in the related art to activate periodically current switches such as silicon controlled rectifiers, in primary transformer windings to produce a voltage (and current flow) of alternating phase in the secondary windings. When current requirements are not excessive, it is known in the art to increase the frequency at which the converters can function. Higher frequencies permit physically smaller components to be employed, such as capacitors. However, as higher frequencies are utilized, other effects become important. For example, it is known in the art to utilize a common oscillator to control conduction through two switches (and through transformer windings associated with each switch.) To prevent simultaneous conduction by the two switches that can result in excessive energy dissipation, an inverter element can be coupled between the oscillator and one of the transistors. As the frequency is increased, the delay of the inverter element can result in undesirable simultaneous conduction by the two switches.

SUMMARY

It is an object of the present invention to provide an improved converter for converting a dc signal to an ac signal.

It is another object of the present invention to provide two transistors for alternatively introducing current into two primary windings.

It is a more particular object of the present invention to provide switches for alternatively introducing current into primary coils of a transformer, the apparatus of the invention preventing simultaneous conduction of the two switches.

It is yet another particular object of the present invention to provide a third coil in the primary winding configuration of a transformer, the third winding controlling conduction of current through one of two transistor switching circuits and thus controlling conduction of current to an associated transformer winding.

It is still another particular object of the present invention to provide two transistor switching units, alternatively applying current to two primary windings of a transformer and wherein the two switching units are not simultaneously conducting.

The aforementioned and other objects of the present invention are accomplished by a transformer having three windings in the primary coil configuration. The first two primary windings alternatively introduce current of opposite phase into the transformer. The control of current through each of the two windings is accomplished by a transistor switching unit associated with each winding. Conduction of a first transistor switching unit, and consequently conduction through an associated primary winding, is accomplished by a device for periodically applying and removing an actuation signal to the control element (gate) of the transistor switching unit. The conduction of the second transistor switching unit and consequently the conduction of current through an associated second winding is controlled by a voltage generated in a third winding and applied to the control element (gate) of the second transistor switching unit. The voltage in the third winding has the correct phase to permit conduction in the second transistor switching unit upon interruption of the current in the first primary winding. The two transistors cannot be simultaneously conducting.

These and other features of the invention will be understood upon reading the specification along with the figures.

DESCRIPTION OF THE PREFERRED EMBODIMENT Detailed Description of the Figures

Figure 1:
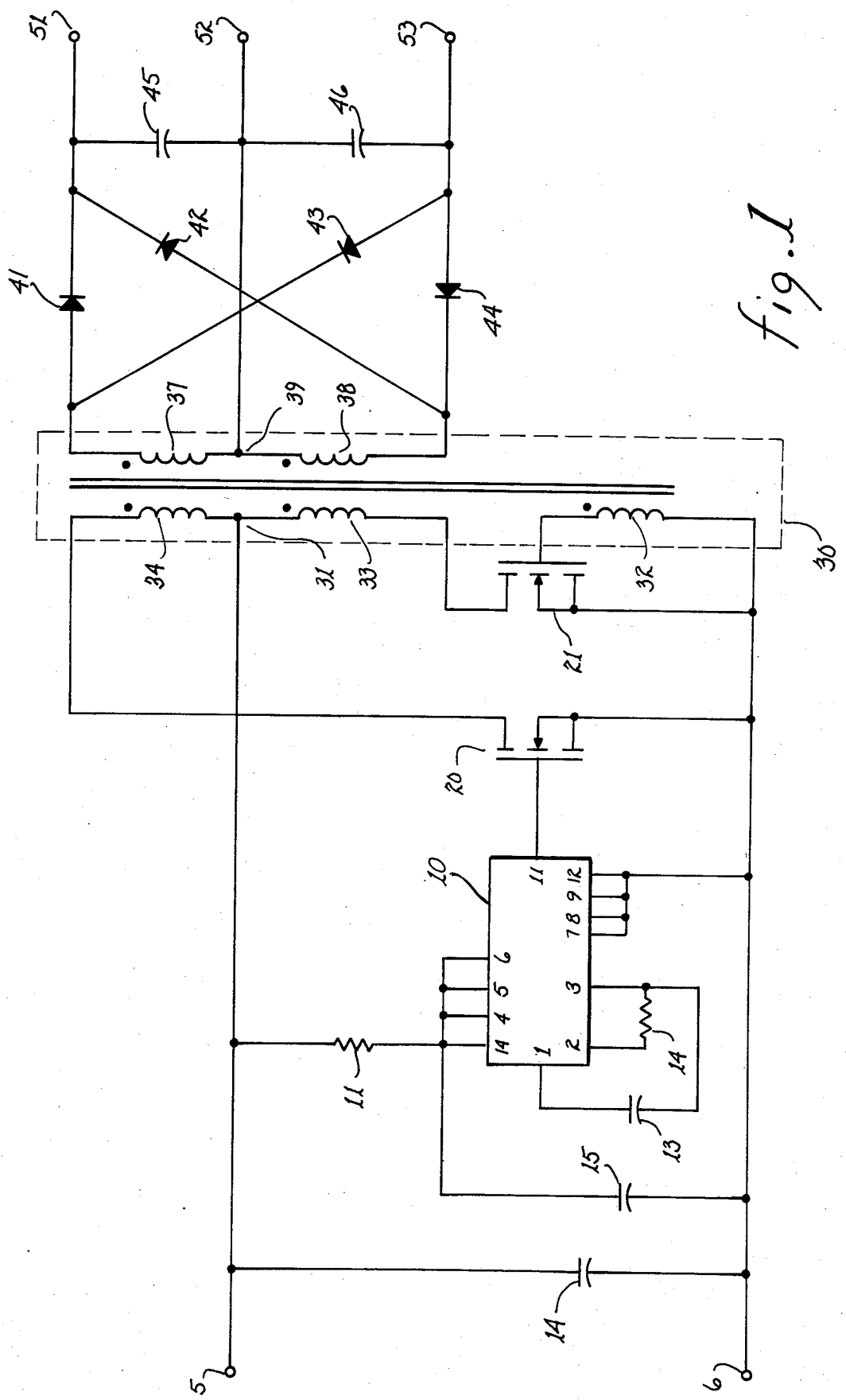
FIG. 1 is a schematic diagram of a dc to dc converter according to the instant invention.

Referring to FIG. 1, terminals 5 and 6 are the voltage input terminals for a dc voltage, terminal 5 being coupled to a positive input voltage and terminal 6 being coupled to a negative (relative to terminal 5) input voltage. Therminal 5 is coupled through capacitor 14 to terminal 6, is coupled to one terminal of resistor 11 and is coupled to an terminal coupled to each position of the two principal primary windings 33 and 34. The second terminal of resistor 11 is coupled to terminals 14, 4, 5, and 6 of a CMOS multivibrator 10 and through capacitor 15 to input terminal 6. Terminal 2 of multivibrator 10 is coupled through resistor 14 to terminal 2 of multivibrator 10 and through capacitor 13 to terminal 1 of multivibrator 10. Terminals 7, 8, 9 and 12 of multivibrator 10 are coupled to input terminal 6. Input terminal 6 is coupled to a source terminal of MOS transistor 20, to a source terminal of MOS transistor 21 and through a feedback or control winding 32 of transformer 30 to a gate terminal of transistor 21, the standard polarity of the feedback winding 32 being coupled to the gate terminal. The drain terminal of transistor 21 is coupled through a primary winding 33 to the intermediate terminal 31, the standard polarity of the primary winding 33 being coupled to the intermediate terminal. The gate terminal of transistor 20 is coupled to terminal 11 of multivibrator 10, while the drain terminal of transistor 20 is coupled through a primary winding 34 of transformer 20 to the intermediate terminal 31, the standard polarity of the primary transformer winding 34 being coupled to the drain terminal of transistor 20. The output terminals of the voltages produced in the secondary windings of the transformer 30 and 51, 52 and 53. Output terminal 51 is the positive terminal, output terminal 52 is the common terminal and output terminal 53 is the negative terminal. Output terminal 52 is coupled through capacitor 45 to terminal 51, through capacitor 46 to terminal 53 and is coupled to transformer 30 secondary windings 37 and 38 at terminal 39. The standard polarity of secondary winding 38 is associated with terminal 39. The second terminal of secondary transformer winding 38 is coupled to a cathode terminal of diode 44 and an anode terminal of diode 42. The second terminal of secondary winding 37, the standard polarity terminal, is coupled to an anode of diode 41 and a cathode of diode 43. The anode of diode 41 and the anode of diode 42 are coupled to terminal 51, while the cathode of diode 44 and the cathode of diode 43 are coupled to terminal 53. Because the converter is designed to operate at a relatively high frequency, transformer 30 is shielded. Typical values for the elements are 6.8 k ohms for resistor 11 and resistor 14, 22 pf for capicator 13, 0.01 μF for capacitor 15 and 0.33 μF for capacitor 14. Typical operating parameters are 600 Khz frequency and 15 volt input voltage.

Figure 2:
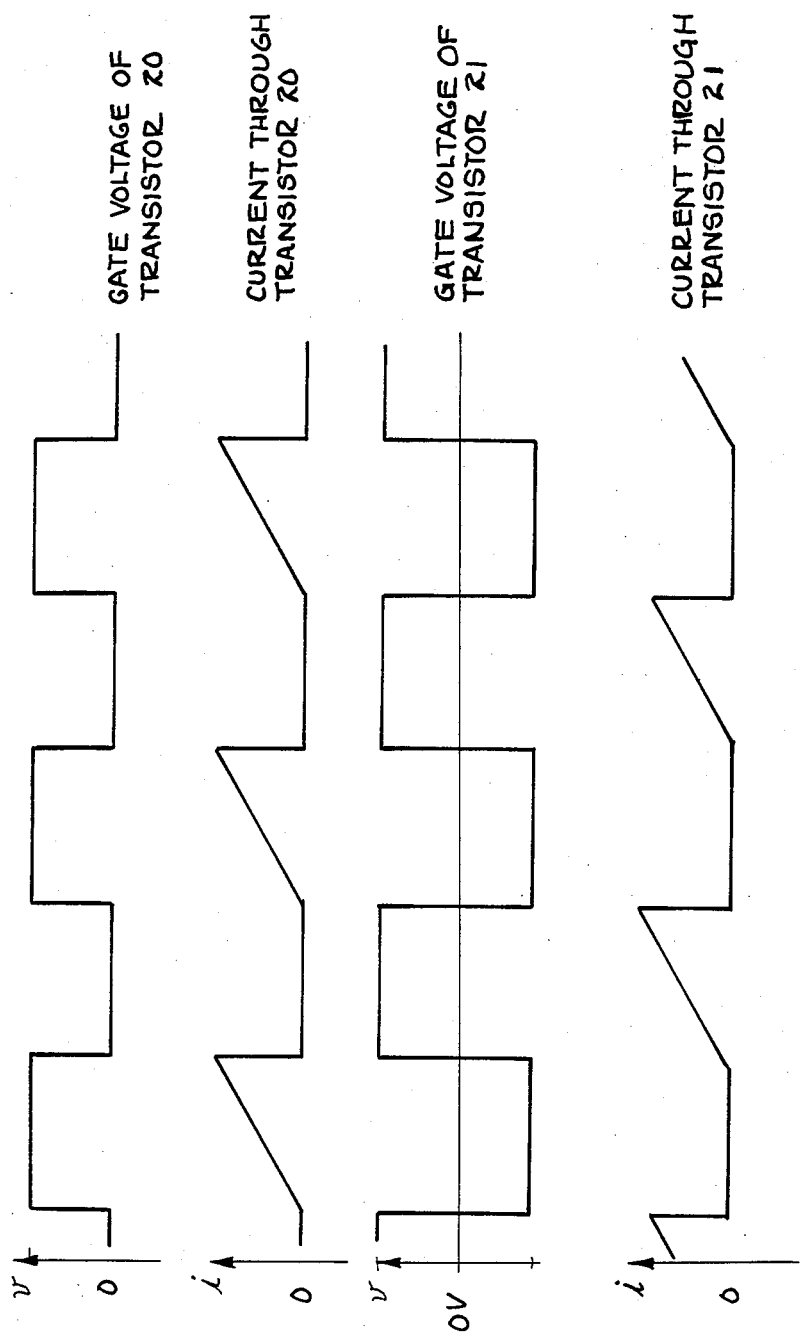
FIG. 2 is a timing diagram illustrating the control voltages in the instant invention.

Referring to FIG. 2, idealized waveforms for the current conducted through transistors 20 and 21 under no-load conditions as shown along with the idealized waveforms for gate voltages controlling the associated transistors. The gate voltage of transistor 20 can alternate, in a typical mode of operation from 0 to 6 v, while gate voltage of transistor 21 will vary from −6 v to +6v.

Operation of the Preferred Embodiment

Referring once again to FIG. 1, the multivibrator 10 is configured to act as an oscillator for applying a signal from terminal 11 to the gate of transistor 20 for a predetermined period of time. The oscillator then removes the signal activating transistor 20, generally, for the same period of time. During the period of activation of transistor 20, current flows through the primary winding 34 from terminal 5 to terminal 6. As current flows through primary winding 34, a voltage is induced in winding 32. The polarity of the induced voltage in winding 32 maintains transistor 21 in a non-conducting state. When the activation signal is removed from the gate of transistor 20 and the transistor is placed in a non-conducting state, the current in the primary winding is interrupted and a reverse electromotive force is generated causing a change in polarity of the signal applied to the gate of transistor 21. This change in polarity causes transistor 21 to become conducting. Current then flows through winding 33, causing a change in the current flow in the secondary windings and maintaining the conducting state of transistor 21 through the voltage induced in winding 32. Transistor 21 remains in a conducting state until the activation signal is applied to transistor 20, and the flow of current through primary winding 34 induces a voltage in winding 32 causing transistor 21 to be placed in a non-conducting state.

Thus it will be seen that conduction through transistor 21 is determined by non-conduction through transistor 20 and simultaneous actuation of the two transistors cannot occur.

Elements 41, 42, 43 and 44 provide full wave rectification of the transformer signal to provide a dc output across terminals 51 and 53. It will be clear that dc to ac conversion can be performed by removing the rectifying elements.

The invention can function in a manner that maintains zero magnetic flux in the transformer core. This phenomenon will result in an equalization of the duty cycles of each transistor for small excursions from equal transistor duty cycles. As a result of any small imbalance in the duty cycle, flux will accumulate in the transformer core and will result in a change of the on-set of conduction in the transistors.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A dc to dc/ac converter comprising:

a transformer having a primary consisting of a first primary winding, a second primary winding, and a feedback winding, said transformer also comprising a first secondary winding and a second secondary winding;

a first metal oxide transistor coupled to said first primary winding for controlling conduction of current through said first primary winding during a first portion of a cycle;

a CMOS multivibrator connected to said first transistor, said multivibrator providing an activation signal; and a second metal oxide transistor coupled to said second primary winding, said second metal oxide transistor controlling conduction of current therethrough, said second metal oxide transistor being coupled to said feedback winding between a gate and a source of said second metal oxide transistor, said feedback winding causing said second metal oxide transistor to be conducting during a second portion of said cycle.

2. The dc to dc/ac converter of claim 1 wherein said transformer provides a high frequency ac output at the terminals of said secondary windings.

3. The dc to dc/ac converter of claim 2 wherein said first portion of said cycle and said second portion of said cycle are substantially equal.

4. An apparatus for converting a dc voltage to an ac voltage comprising:

input terminal means for accepting an input dc voltage;

a transformer having a primary consisting of a first and a second primary winding and a control winding, said transformer further comprising a secondary winding and a core;

first switching means coupled to said first primary winding for establishing magnetic flux in said core, wherein said first switching means comprises a metal oxide transistor;

second switching means coupled to said second primary winding for establishing a magnetic flux in said core, wherein said second switching means comprises a metal oxide transistor, wherein said control winding activates said second switching means in response to a predetermined core flux condition; and a CMOS multivibrator connected to said first switching means that activates said first switching means for a period of time and disables said first switching means for a substantially equal period of time.

5. The dc to ac converter apparatus of claim 4 wherein said first switching means is coupled in series between said input terminal means for said dc voltage and said first primary winding.

6. The dc to ac converter apparatus of claims 4 or 5 wherein said second switching means is coupled between said second primary winding and said input terminal means for said dc voltage, wherein a control element of said second metal oxide transistor is coupled to said control winding of said transformer means.

7. The dc to ac converter apparatus of claim 6 wherein said first and said second switching means are activated for approximately equal periods of a cycle, wherein said core magnetic flux equalizes said cycle periods.

8. The dc to ac converter apparatus of claim 6 wherein said transformer core magnetic flux establishes an equilibrium condition for periods of operation by said first switching means and said second switching means.

* * * * *